April 16, 1963  A. M. VIGILANTE  3,085,567
FREQUENCY SELECTIVE METHOD AND APPARATUS FOR SPHYGMOMANOMETRY
Filed March 10, 1961
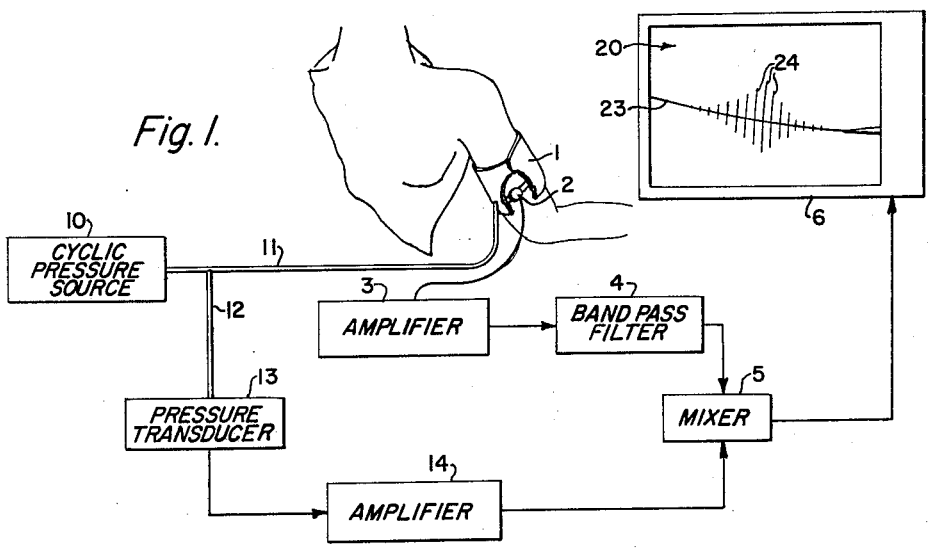
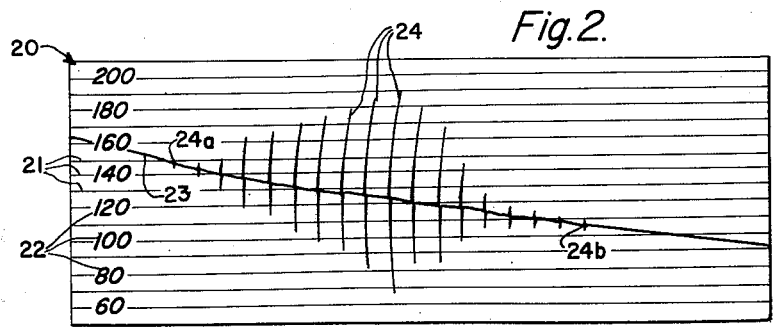
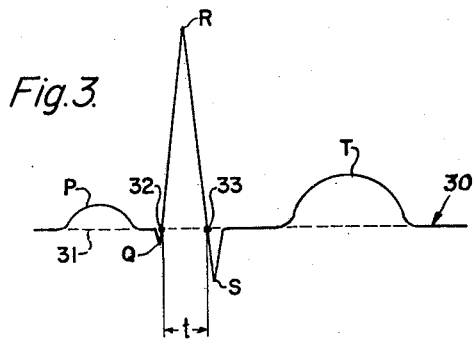
INVENTOR:
ARTHUR M. VIGILANTE,
BY
Agent.

United States Patent Office 3,085,567
Patented Apr. 16, 1963

3,085,567
FREQUENCY SELECTIVE METHOD AND APPARATUS FOR SPHYGMOMANOMETRY
Arthur M. Vigilante, Malibu, Calif., assignor to The Garrett Corporation, Los Angeles, Calif., a corporation of California
Filed Mar. 10, 1961, Ser. No. 131,695
11 Claims. (Cl. 128—2.05)

My invention relates to a method and apparatus for providing objective indication of cardiovascular phenomena and, more particularly, to a method and apparatus operable to derive signals indicative of diagnostically important cardiovascular phenomena independently of the skill or judgment of an operator and in suitable form for transmission to recording, indicating or control instruments which may be located remotely of the point of origin of said signals, a preferred practice of the invention being herein described with particular reference to a method and apparatus for indirect measurement of arterial blood pressure.

In medical practice as well as in various branches of biological research it is often desirable to assess the cardiovascular behavior of a subject by measurement of discrete phenomena having known diagnostic value in relation thereto, exemplary instances of such phenomena being the heart or pulse rate and the arterial blood pressure of the subject, the latter being generally expressed in terms of a systolic value corresponding to the maximum fluid pressure acting on the arterial wall consequent to contraction of the left ventricle of the heart, and a diastolic value corresponding to the minimum fluid pressure acting on the arterial wall consequent to relaxation of the left ventricle the difference between the systolic and diastolic values being commonly referred to as the pulse pressure. The methods in use for measurement of these pressures may be broadly divided into two classes, commonly referred to as direct and indirect methods of sphygmomanometry, according to whether measurement is based on operations performed internally or externally of the cardiovascular system, numerous variations on the techniques and apparatus of each method having been developed by those skilled in the art.

In the direct method of sphygmomanometry, an open ended tube or catheter is introduced into the arterial system of the subject, the fluid pressure acting upon the open end of the tube being transmitted to indicator means located externally of the subject. Though the ability to provide a continuous, objective indication of the complete pulse pressure cycle between the systolic and diastolic limits thereof in form suitable for transmission to remotely located recording instruments is an advantageous feature of this method, the discomfort, hazard, and limitation of movement imposed on the subject by the necessity for providing a skin puncture or incision through which the catheter may be inserted and connected to external pressure indicator means are, in most circumstances, concomitantly disadvantageous. For this reason, the indirect or auscultatory method is most widely used where precise and continuous knowledge of the pulse pressure waveform is not essential to the purpose at hand.

In the indirect method of sphygmomanometry as customarily practiced, a pneumatic occlusive cuff is applied to a conveniently accessible portion of the subject, commonly, for example, an arm, and inflated until auscultation of the subject below the site of the cuff, for example at the ante-cubital fossa, indicates that arterial flow has been totally occluded. Then cuff is gradually deflated, and the values of the declining pressure therein are recorded whenever auscultatory detection reveals the appearance and disappearance of vascular sounds having known correlation with the occurrence of systolic and diastolic blood pressures.

Though this method, as briefly summarized, has been widely accepted for routine examination and diagnostic purposes, it is apparent that the necessary presence of a trained observer to correlate the auscultated sounds with the value of the cuff pressure renders it inappropriate for use in situations where it may be desired to evaluate the cardiovascular behavior of a human or animal subject in a situation of physical stress imposed by unusual environmental conditions such as close spatial confinement, high noise level, or extremes of temperature, pressure, or motion under which the skill, judgment or safety of an observer might be impaired. In order to overcome this as well as other well known difficulties commonly associated with the indirect method of sphygmomanometry, my invention, which is based on the discovery of certain important characteristics relative to arterial pulse pressure waves, pertains to a novel method of sphygmomanometry affording means for evaluating systolic and diastolic pressures independently of the aurol acuity and judgment of a human observer.

More particularly, my invention is based on the discovery that certain component frequencies or frequency bands, apparently imparted to the arterial pulse pressure wave by cardiac action, are so affected by forced constriction of the arterial lumen as to provide an accurate and reliable index of the systolic and diastolic values of the arterial blood pressure, the amplitude of such component frequencies being substantially augmented in the occluded region when the occlusive pressure lies within upper and lower limits coinciding respectively with the systolic and diastolic values of the arterial pressure. For the purposes of my invention as herein described I have found, for example, that a frequency of approximately 35 cycles per second, but more generally defined for practical purposes as a frequency band having a lower limit of approximately 30 and an upper limit of approximately 40 cycles per second, undergoes a clearly defined and substantial increase in amplitude in the pulse pressure wave of a human subject when the arterial flow thereof is occluded by constrictive pressure within limits which coincide with the systolic and diastolic arterial blood pressure of such subject. Thus, according to my invention, if a first signal indicative of the occlusive pressure applied to a subject is superimposed on or otherwise correlated with a second signal indicative of a marked change in amplitude of the 30 to 40 cycle per second band of component frequencies in the arterial pulse of such subject in the region of occluded flow, the end points of the second signal will coincide with values of the first signal corresponding to the systolic and diastolic arterial blood pressure of the subject.

Though the teachings of the prior art include numerous proposals for indirect methods of sphygmomanometry wherein vascular sounds occurring in a region of occluded flow are electrically amplified and recorded for correlation with applied occlusive pressures, the systolic and diastolic values of the arterial blood pressure being determined according to the end points of the amplified signal, such methods should not be confounded with that of the present invention.

While electrical auscultation and amplification of arterial sounds can furnish an indication of the onset of such sounds in a region of declining occlusive pressure, and hence a satisfactory indication of the systolic arterial blood pressure, the indication of diastolic pressure, which is based on the diminution in the auscultated sound to below a predetermined threshold as occlusive pressure is further decreased, is wholly dependent on the amplification or gain of the instrumentation used to detect and amplify such sounds.

As is well known to medical practitioners, the measurement of systolic and diastolic blood pressure by auscultation of an occluded flow depends on both the magnitude and the quality of the vascular sounds detected, some skill on the part of the observer being needed in order to distinguish subtle changes therein as the declining occlusive pressure passes through the value coinciding with the diastolic blood pressure of the subject. Further, where a subject of poor cardiovascular tone is to be examined, the arterial sounds may be so ill-defined as to preclude nice discrimination of variations therein by conventional stethoscopic auscultation, and the degree of amplification needed for electrical auscultation may be so high as to introduce spurious signals due to adventitious noise or slight bodily movements of the subject.

In the present invention, therefore, the foregoing limitations of previous methods of indirect sphygmomanometry, namely the critical dependence on the degree of amplification of the electrical methods, and the similar dependence on the personal skill and aural acuity of the observer characteristic of stethoscopic methods, are overcome by means of a frequency selective method capable of providing consistently accurate indications of both systolic and diastolic blood pressure throughout a wide range of amplification as well as in noisy or otherwise unfavorable environments.

It is, therefore, an object of the present invention to provide a method of sphygmomanometry depending on measurements and operations performed externally of the subject and affording a degree of objectivity comparable to that achievable by methods employing catheters or the like.

It is another object of the invention to provide a method for sphygmomanometry wherein signals indicative of systolic and diastolic blood pressure may be developed in suitable form for electric or electromagnetic telemetry or control.

It is another object of the invention to provide an automatic, telemeterable method for sphygmomanometry which is operable independently of an observer.

It is another object of the invention to provide a frequency selective method for deriving a signal indicative of critical pressures in an occluded arterial flow.

It is another object of my invention to provide an indirect method for sphygmomanometry that is relatively immune to disturbance by adventitious noise or bodily movement of the subject.

It is another object of my invention to provide an apparatus for indirect sphygmomanometry.

It is another object of my invention to provide an apparatus for indirect sphygmomanometry wherein amplitude fluctuations of a selected frequency band within the frequency spectrum developed by an arterial pulse pressure wave may be isolated and correlated with an occlusive pressure wave.

It is another object of my invention to provide an apparatus whereby selected frequencies of arterial pulse pressure waves may be automatically correlated with occlusive pressures for purposes of sphygmomanometry.

These and other objects of my invention will be more clearly understood from the following description of a preferred practice thereof taken in reference to the accompanying drawings, wherein:

FIGURE 1 illustrates a typical apparatus for the practice of my invention, the apparatus being shown diagrammatically and as applied to sphygmomanometry of a human subject;

FIGURE 2 illustrates an exemplary measurement as recorded by the apparatus of FIGURE 1; and FIGURE 3 is a simplified representation of a typical electrocardiogram of a normal human heart.

Referring to FIGURE 1, an inflatable cuff 1 of well known type is fitted to the arm of a subject for occlusion of the brachial artery thereof in a region approximately midway between the shoulder and elbow, the cuff being shown partially broken away to illustrate the location of a pressure transducer 2 secured to the arm of the subject as by an adjustable strap and operable to convert the pulse pressure wave in the brachial artery to a corresponding electrical signal for application to an amplifier 3, both the transducer 2 and the amplifier 3 being of known design and preferably having a lower limit of frequency response in the region of two or three cycles per second. It is to be understood that the transducer 2 may be located otherwise than as shown, for example, at the cubital fossa where at any other position where a satisfactory response to arterial pressure waves in the occluded region may be obtained, the particular location illustrated being favored, however, because it permits relative freedom of movement of the subject and because the overlying material of the cuff 1 provides some degree of acoustic insulation, both of which considerations tend to favor the development of a more advantageous signal to noise ratio than is generally obtainable when the transducer is located elsewhere.

The output of the amplifier 3 is applied through a bandpass filter 4 and a mixer 5 to appropriate indicating or recording apparatus such as the graphical recorder 6 shown, it being understood, however, that in alternate embodiments of the invention additional elements, for example telemetry transmission and receiving or control apparatus, may be interposed between the mixer 5 and the indicating or recording instrument used. The bandpass filter 4, which may, for example, comprise an appropriate network of resistive and capacitive elements or other well known arrangement for selective passage of a desired frequency band, is designed to suppress frequencies on either side of a selected pass-band wherein signals derived from the brachial artery pulse are informatively related to the cardiovasuclar phenomena which it is desired to observe. In the present invention, it has been found, for example, that where the systolic and diastolic blood pressures of a human subject are to be measured, a filter having a pass-band of approximately ten cycles per second width centered around a frequency of thirty-five cycles per second provides a signal whose appearance during a period of declining occlusive pressure occurs when that pressure coincides with the systolic blood pressure of the subject, and whose subsequent disappearance during a later phase of the same period occurs when the occlusive pressure coincides with the diastolic blood pressure of the subject.

In order to provide a varying occlusive pressure of the desired range, gradient, and duration for correlation with the arterial pulse signal, a cyclic pressure source 10 communicates with the cuff 1 via flexible conduit 11, a suitable tap 12 being provided for communication with a second pressure transducer 13 adapted to supply a voltage or other appropriate electrical analog of the occlusive pressure for application through an amplifier 14 to the mixer 5. It is to be understood that the cyclic pressure source 10, which is indicated schematically in the drawing, may be of any construction suited to alternate application and release of the desired occlusive pressure, the customary operating pressure range of interest extending from zero to approximately 250 millimeters of mercury (mm. Hg) and the gradient of pressure release preferably being in the approximate region of 2 mm. Hg per second to 4 mm. Hg per second. Thus, for ordinary diagnostic purposes, pressure may be applied and released by means of an ordinary bulb type of pump equipped with a screw operated release valve, such as is commonly supplied with commercial sphygmomanometers; alternatively, where it is desired to measure the blood pressure of a subject more or less continually over an extended period or under circumstances where the presence of an observer would be unsafe or otherwise undesirable, various well known means may be adapted to the purpose of supplying a repetitive pressure cycle of the desired range, gradient, and frequency.

In the mixer 5, the signal output of the bandpass filter 4 is superimposed on that of the amplifier 14 associated with the pressure transducer 13. The resulting composite signal applied to the recording apparatus 6 comprises a desired electrical quantity, for example voltage, whose deviation from a known reference value or datum reflects both the occlusive pressure applied to the cuff 1 and the thirty to forty cycle per second component of the pulse pressure waves applied to the transducer 2.

Thus, referring to FIGURE 2, which is an exemplary representation of the composite signal such as might be produced by a recording galvanometer or other graphical recording instrument of well known type, the numeral 20 denotes a representative length of recording paper having fiducial lines 21 identified by appropriate indicia 22 preferably corresponding to values of the scale in which blood pressure is to be measured, the trace of the recording pen during a typical measurement being generally designated by the numeral 23, it being understood that the record is to be read from left to right, and that the negative slope of the trace 23 indicates a decline in occlusive pressure with time in accordance with accepted practice. Superimposed on the trace 23 is a series of cyclic excursions 24 corresponding to the thirty to forty cycle component of the pulse pressure wave isolated by the bandpass filter 4, the members of the series being spaced from each other in accordance with the time intervals separating the individual pulse beats, and the envelope thereof defining the period of transition of the occlusive pressure from the systolic to the diastolic value of the arterial blood pressure of the subject under examination. Thus, in the record shown in the drawing, the first cyclic excursion 24a of the trace 23 defines the beginning of the envelope and therefore coincides with the systolic blood pressure, the position of the excursion 24a, as shown, indicating a pressure of approximately 147 mm. Hg; and the cyclic excursion 24b defines the end of the envelope, coinciding with the diastolic pressure and defining a value therefor of approximately 107 mm. Hg.

Systematic observation of a large number of human subjects has disclosed that isolation of that component of the pulse pressure wave which occupies a frequency band extending from approximately thirty to approximately forty cycles per second yields a signal whose envelope may be correlated with occlusive pressure according to the method and apparatus disclosed herein to provide an accurate indication of the systolic and diastolic blood pressure of such subjects.

Though the invention has been described in terms of the aforementioned thirty to forty cycle per second band of frequencies, it is not to be understood that the practice of the invention is limited thereto, other bands being available for the satisfaction of particular requirements. Where an environment includes noise or mechanical vibration such as might impair the sensitivity to pulse pressure waves of instrumentation operating in a thirty to forty cycle per second frequency band, for example, it has been found that a satisfactory indication of the systolic and diastolic blood pressures can alternatively be based on the detection of a pulse wave component occupying a frequency band extending from approximately fifteen to approximately twenty cycles per second.

Further, where animal subjects are under observation, some deviation from these frequency bands may be anticipated, it being contemplated that the appropriate frequencies for use with particular animal species may be ascertained through comparison of direct or indirect blood pressure measurements made on representative individuals of such species with corresponding frequency analyses of the associated pulse pressure waves. In accordance with the results of such comparison, a fixed or variable filter tuned to an appropriate pressure indicative portion of the frequency spectrum comprising the pulse pressure wave may be substituted for the bandpass filter 4 of FIGURE 1 so as to adapt the apparatus for use with other than human subjects.

Correlation of pulse pressure frequency spectra with electrocardiographic data indicates that the thirty to forty cycle per second component of the pulse pressure wave is functionally related to the contraction of the left ventricle of the heart and closure of the atrio-ventricular valves. Referring to FIGURE 3, an idealized version of a typical electrocardiogram is shown wherein the successive excursions of the trace 30 above and below a fiducial line 31 are labeled P, Q, R, S and T according to conventional practice, the relation between such excursions and the events of the normal cardiac cycle being well known to those skilled in the art.

For the purposes of the present invention, attention may be confined to the positive excursion designated by the letter "R," this excursion being commonly referred to in the art as the R-Wave, having a period "$t$" represented as the horizontal distance between points 32, 33. As is well known to those skilled in the art, the peak of the R-Wave coincides approximately with the onset of ventricular contraction and closure of the atrio-ventricular valves, as well as with the peak intensity of the so-called first heart sound wherein the thirty to forty cycle component frequency of the pulse pressure wave as discussed in the foregoing portions of this specification is believed to originate.

Where it is desired to practice the method of the present invention in cases of irregular or anomalous cardiac action wherein the thirty to forty cycle per second passband hereinbefore specified may not provide satisfactory indication or discrimination of systolic and diastolic limits, it has been found that adequate, if not optimum, results can be achieved through the selection of a passband having a width of approximately four-tenths of an octave centered at a frequency corresponding to four times the reciprocal of the period "$t$" of the electrocardiogram R-Wave. For example, if the period of the R-Wave is eighty milliseconds (.080 sec.) an appropriate passband would be centered on 50 cycles per second and would extend from approximately 43 to 57 cycles per second.

It will be apparent to those skilled in the art that while the apparatus disclosed in the drawings and hereinbefore particularly described is specifically adapted to the practice of the method of blood pressure determination herein set forth, such method is not limited to use only with the apparatus shown and described, but may in fact be practiced independently thereof, a number of instruments well known to those skilled in the arts of electrocardiology, phonocardiology, and the like being adaptable to the practice of the described method. It will be additionally apparent that while the invention as shown and described is particularly adapted to indirect measurement of arterial blood pressure, the scope of its utility is not limited thereto but is, in fact, substantially augmented by the collateral indication of pulse rate and relative intensity of the selectively filtered pulse pressure waves, both of which indications may be of substantial diagnostic importance. Further, though the invention has been described with reference to electric signals related to occlusive pressure and pulse pressure waves, the techniques and apparatus for developing, amplifying, filtering and otherwise treating such signals being well known to those skilled in the art, it is intended that, with regard to the method comprehended thereby such description be construed as merely exemplary, it being contemplated that those skilled in the arts relating to fluid pressure responsive instruments, for example, may have occasion to devise apparatus for the practice of the invention independently of electric signal or transducer means.

From the foregoing specification it may be seen that the present invention discloses a novel method of indirect sphygmomanometry which may be practiced independently of the skill or aural acuity of an observer and in circumstances and environments where the presence of such an observer may be undesirable. Further, the method and apparatus disclosed may be readily adapted to an automatically controlled cycle of operation and to control of other apparatus, for example in the administration of anaesthesia, as well as to remote presentation, by either electric or electromagnetic transmission of the measured data. It is contemplated that those skilled in the art will have occasion to practice numerous variations on specific features of the apparatus and method disclosed herein, the instant description and drawings thereof being presented by way of example only and not by way of limitation, and it is my desire that all such variations falling within the intended spirit and scope of the invention be secured to me by Letters Patent.

What is claimed is:

1. A method of measuring systolic and diastolic pressures in an artery under adverse noise conditions, comprising the steps of:
    applying a pressure to the artery sufficient to occlude arterial flow;
    diminishing the pressure to initiate restricted flow and develop pressure variations of sonic frequency, and continuing to diminish the pressure until the sonic-frequency pressure variations effectively terminate;
    selecting components of the sonic-frequency pressure variations distinguishable from ambient noise;
    and correlating the selected components with the pressure to ascertain the respective magnitudes of the latter upon initiation and termination of the former.

2. A method of measuring systolic and diastolic pressure in an artery under adverse noise conditions, comprising the steps of:
    applying pressure to the artery to occlude arterial flow;
    releasing the pressure to restore arterial flow and initiate recurrence, at the systolic repetition frequency, of a range of pressure variations extending into the sonic frequencies, and continuing to release the pressure at least until the pressure variations cease;
    producing a first signal indicative of the diminishing pressure during the period of pressure release;
    producing a second signal representing the pressure variations;
    selecting a band of frequency components of the second signal distinguishable from ambient noise;
    and correlating the initiation and cessation times of the selected band of frequency components of the second signal with the first signal to ascertain the respective systolic and diastolic pressures.

3. A method of measuring systolic and diastolic pressures in an artery under adverse noise conditions, comprising the steps of:
    applying pressure to the artery to occlude arterial flow;
    releasing the pressure to restore arterial flow and initiate recurrence, at the systolic repetition frequency, of a range of pressure variations extending into the sonic frequencies, and continuing to release the pressure at least until the pressure variations cease;
    producing a first signal indicative of the diminishing pressure during the period of pressure release;
    producing a second signal representing the pressure variations;
    selecting a band of frequency components of the second signal having a bandwidth of approximately ten cycles per second centered at approximately thirty-five cycles per second in order to minimize the effect of ambient noise on the second signal;
    and correlating the initiation and cessation times of the selected band of frequency components of the second signal with the first signal to ascertain the respective systolic and diastolic pressures.

4. The method of measuring systolic and diastolic arterial pressures represented in claim 3 wherein the selecting step comprises the selection of a band of frequency components of the second signal having a bandwidth of approximately five cycles per second centered at approximately seventeen and one-half cycles per second.

5. The method of measuring systolic and diastolic arterial pressures represented in claim 3 wherein the selecting step comprises the selection of a band of frequency components of the second signal having a bandwidth of about five to ten cycles per second within a frequency spectrum extending from about fifteen to about forty cycles per second.

6. Apparatus for indicating the systolic and diastolic arterial blood pressures of a subject under adverse ambient noise conditions, comprising:
    means including a hollow expansible cuff coupled to the subject for occluding and restoring the flow of blood through an artery in response to pressure variations developed within the cuff;
    means coupled to the occluding and restoring means for indicating pressure variations of the cuff;
    a pressure transducer coupled to the subject within sensing distance of the flow-regulated artery, and downstream from the cuff for producing, in response to pulsations of blood flow, a periodic signal containing frequency components representing a range of pressure variations extending from the pulsation frequency into the sonic-frequency range;
    means including a bandpass filter coupled to the pressure transducer for selecting a band of frequency components of the periodic signal distinguishable from ambient noise;
    and means coupled to the selecting means to facilitate observation and correlation of the periodic peaks of the band of frequency components with indications of the cuff-pressure indicating means.

7. A blood pressure indicator as represented in claim 6 wherein the selecting means comprises a bandpass filter coupled to the pressure transducer for passing effectively only the frequency components of the periodic signal within a bandwidth of about ten cycles per second centered approximately at thirty-five cycles per second.

8. A blood pressure indicator as represented in claim 6 wherein the selecting means comprises a bandpass filter coupled to the pressure transducer for passing effectively only the frequency components of the periodic signal within a bandwidth of about five cycles per second centered at about seventeen and one-half cycles per second.

9. Apparatus for indicating the systolic and diastolic arterial blood pressures of a subject under adverse ambient noise conditions, comprising:
    means including a hollow expansible cuff coupled to the subject for occluding and restoring the flow of blood through an artery in response to pressure variations developed within the cuff;
    means coupled to the occluding and restoring means for indicating pressure variations of the cuff;
    a pressure transducer coupled to the subject within sensing distance of the flow-regulated artery, and downstream from the cuff for producing, in response to pulsations of blood flow, a periodic signal containing frequency components representing a range of pressure variations extending from the pulsation frequency into the sonic frequency range;
    means including a bandpass filter coupled to the pressure transducer for passing effectively only the frequency components of the periodic signal having a bandwidth of about five to ten cycles per second within a frequency spectrum extending from about five to about forty cycles per second;
    and means coupled to the selecting means to facilitate observation and correlation of the periodic peaks of the frequency components with indications of the cuff-pressure indicating means.

10. A blood pressure indicator as represented in claim 9 wherein the passing means comprises a bandpass filter coupled to the pressure transducer for passing effectively only the frequency components of the periodic signal having a bandwidth of about four-tenths of an octave centered at a frequency about four times the reciprocal of the length of the R-wave portion of an electrocardiographic representation of the cardiovascular cycle of the subject.

11. A method of measuring systolic and diastolic pressures in an artery of a subject under adverse conditions, comprising the steps of:

ascertaining the length of the R-wave portion of an electrocardiographic representation of the cardiovascular cycle of the subject;

applying pressure to an artery of the subject until arterial flow is occluded;

releasing the pressure to restore arterial flow and initiate recurrence, at the systolic repetition frequency, of a range of pressure variations extending into the sonic frequencies, and continuing to release the pressure at least until the recurrent pressure variations cease;

producing a first signal indicative of the diminishing pressure during the period of the pressure release;

producing a second signal representing the pressure variations;

selecting a band of frequency components of the second signal having a bandwidth of about four-tenths of an octave centered at a frequency about four times the reciprocal of the length of the R-wave portion;

and correlating the initiation and cessation times of the selected band of frequency components of the second signal with the first signal to ascertain the respective systolic and diastolic pressures.

References Cited in the file of this patent

UNITED STATES PATENTS

| | | |
|---|---|---|
| 2,756,741 | Campanella | July 31, 1956 |
| 2,865,365 | Newland | Dec. 23, 1958 |
| 2,875,750 | Boucke | Mar. 3, 1959 |
| 2,944,542 | Barnett | July 12, 1960 |
| 2,989,051 | Zuidema | June 20, 1961 |